United States Patent Office 3,647,708
Patented Mar. 7, 1972

3,647,708
LUMINESCENT MATERIAL
Willem Lambertus Wanmaker, Johannes Wilhelmus ter Vrugt and Johannes Guiljelmus Cornelis Maria de Bres, Emmasingel, Eindhoven, Netherlands, assignors to U.S. Philips Corporation, New York, N.Y.
No Drawing. Filed July 23, 1970, Ser. No. 57,823
Claims priority, application Netherlands, July 29, 1969, 6911548
Int. Cl. C09k 1/44
U.S. Cl. 252—301.6 R
3 Claims

ABSTRACT OF THE DISCLOSURE

A luminescent material activated by trivalent europium defined by the formula:

$$Me^{3+}{}_{(1-p-2/3q)}Eu_p Me_q{}^{2+}(VO_4)_{1-x-y}(RO_4)_x(BO_3)_y$$

in which $Me^{3+}$ represents yttrium and/or gadolinium, $Me^{2+}$ represents zinc and/or cadmium and R represents phosphorous and/or arsenic. Furthermore:

$0.01 \leq p \leq 0.18$
$0.01 \leq q \leq 0.25$
$0 \leq x \leq 0.80$
$0.02 \leq y \leq 0.60$
$x+y \leq 0.90$

---

The invention relates to a luminescent screen provided with a luminescent material activated by trivalent europium. Furthermore the invention relates to a high-pressure mercury vapour discharge lamp provided with such a screen and to the luminescent material itself.

The vanadate of yttrium and/or gadolinium activated by trivalent europium is known from U.S. patent specification 3,152,085 (Re-issue 26,184). This known vanadate emits red radiation when excited by ultraviolet radiation or by electrons and is currently often used as a red luminescent component in the screen of colour television tubes. Furthermore, this material is frequently used in combination with high-pressure mercury vapour discharge lamps for the completion of the red portion of the spectrum of the radiation emitted by these lamps. The said vanadate is eminently suitable for these uses due to its high output, its deep red emission in a narrow spectral range and its satisfactory temperature dependence. The latter means that the light output is reduced little when the luminescent vanadate is increased in temperature.

The Netherlands patent application 6501838 described a phosphate vanadate of yttrium and/or gadolinium activated by trivalent europium. In this material the phosphorus may be completely or partly replaced by arsenic while the properties of the luminescent material do not substantially change. This known phosphate vanadate has a considerably better temperature dependence as compared with the known vanadate and it has a greater monochromatic red emission. Furthermore, a borate vanadate or a borate phosphate vanadate of yttrium and/or gadolinium activated by trivalent europium are known from the Netherlands patent application 6610689. As compared with the known materials mentioned above these materials yield higher light outputs and in addition the preparation thereof is simpler and whiter materials are obtained.

The maximum of the emission lies at approximately 619 nm. for the vanadates and also for the phosphate vanadates and borate vanadates. It has been found that gadolinium and yttrium may be used in arbitrary ratios in the said known luminescent materials without any noticeable change in properties.

A drawback of all mentioned known luminescent materials is that they show a certain discoloration and stain formation when being used after a number of operating hours in luminescent screens. Notably this stain formation occurs in the luminescent screens of high-pressure mercury vapour discharge lamps. In these lamps the actual discharge vessel is generally provided within a so-called outer envelope which may be evacuated or filled with an inert gas. If a luminescent screen is used in combination with these lamps, a luminescent layer is generally provided on the inner side of the outer envelope. During operation of the lamp the luminescent screen is at a comparatively high temperature for example, 200–300° C.

Stain formation and discoloration generally starts to occur in the luminescent screen of a high-pressure mercury vapour discharge lamp after approximately 4500 operating hours in lamps having comparatively low wattages; in lamps having comparatively high wattages these phenomena already start to occur after approximately 2500 operating hours.

Especially those parts of the luminescent screen which reach the highest temperature during operation show dark coloured stains after a period of time. As a result of stain formation and discoloration the appearance of the lamp is detrimentally influenced in the first place. Furthermore a small colour shift occurs because the percentage of red of the radiation emitted by the lamp is reduced. Since stain formation and discoloration in the luminescent screens of high-pressure mercury vapour discharge lamps are produced fairly irregularly, so that each individual lamp shows these phenomena at different points of time, the said colour shift is especially troublesome in those cases where a number of these lamps is used such as in street illumination. In these cases the occurring colour differences between the lamps individually are clearly noticeable. A further drawback of the known luminescent materials is the occurrence of a reduction in the light output if stain formation and discoloration are produced after a given number of operating hours.

The object of the invention is to limit the above-described drawbacks to a minimum.

According to the invention a luminescent screen comprising a luminescent material activated by trivalent europium is characterized in that the luminescent material is defined by the formula $$Me^{3+}{}_{(1-p2/3q)}Eu_p Me_q{}^{2+}(VO_4)_{(1-x-y)}(RO_4)_x(BO_3)_y$$

in which $Me^{3+}$ represents at least one of the elements from the group ytrium and gadolinium, $Me^{2+}$ represents at least one of the elements from the group zinc and cadmium and R represents at least one of the elements from the group phosphorus and arsenic, and in which $0.10 \leq p \leq 0.18$
$0.10 \leq q \leq 0.25$
$0 \leq x \leq 0.80$
$0.02 \leq y \leq 0.60$
$x+y \leq 0.90$ According to the invention a luminescent screen comprises a trivalent europium-activated borate vanadate or borate phosphate vanadate of yttrium and/or gadolinium wherein a portion of the yttrium and/or gadolinium is replaced by zinc and/or cadmium. Experiments which led to the invention showed that in the luminescent screens according to the invention stain formation and discoloration did not occur or occurred at a very late point of time during the lifetime of the screen. The favorable emission properties and the satisfactory temperature dependence of the trivalent europium-activated vanadates are maintained.

The zinc- and/or cadmium content which is denoted by $q$ in the above given formula must be chosen to be not less than 0.01 because otherwise insufficient improvements are obtained. It has been found that at values of $q$ of more than 0.25 the light output of the luminescent material decreases. Values of $q$ of between 0.02 and 0.15 are prepared because then the best results are obtained as will be proved hereinafter.

The europium content $p$ should be between the limits 0.01 and 0.18. The highest values of the light output are obtained at values of $p$ between 0.02 and 0.10 and these values are preferred.

Partial replacement of yttrium and/or gadolinium by zinc and/or cadmium leads to a considerable improvement with respect to strain formation in both the borate vanadates and the borate phosphate vanadates. Likewise as is the case for the above-mentioned known luminescent materials the ratio between the quantities of yttrium and gadolinium and those between the quantities of phosphorus and arsenic, if a phosphorus-containing material is concerned, may arbitrarily be chosen in the luminescent materials according to the invention, for these ratios do not exert any noticeable influence on the emission properties of the luminescent vanadates.

In the above given formula the phosphorus and/or arsenic content is denoted by $x$. The value of $x$ must be chosen to be not more than 0.8 because at values of $x$ above this limit the light output of the luminescent vanadate is decreased and the emission colour shifts to orange, which is undesirable. The boron content is denoted by the index $y$ in the formula. The boron content must be not more than 0.6 because at higher values borate is formed in addition to the desired borate vandate, which borate has an orange luminescence. The value of the content $x$ and $y$ combined must be not more than 0.9.

If stringent requirements are to be imposed on the luminescent material, notably with regard to the temperature dependence, the light output, the emission colour and the whiteness of the material, luminescent materials according to the invention are preferred which comprise phosphorus and/or arsenic and boron. Optimum results are achieved with phosphorus and/or arsenic contents of between 0.30 and 0.60 and with boron contents of between 0.02 and 0.15.

A further advantage of the luminescent materials according to the invention is that the formation of the luminescent materials is enhanced during their preparation as a result of the addition of zinc and/or cadmium compounds to the reaction mixture. Generally the formation reaction of the materials according to the invention may then be effected at a temperature which is lower than in the case of the known luminescent materials described above.

Finally it was found that when preparing the luminescent materials according to the invention more smoothly flowing powders are obtained than when preparing the known luminescent materials. The smooth flow of a powder is a property which is improtant when using the powder in a screen. Particularly if the screen is coated by means of the so-called electrostatic method, a smoothly flowing powder provides many advantages.

In order that the invention may be readily carried into effect, it will now be described in detail with reference to an example and a few measurements.

EXAMPLE

A mixture of the following materials in the given quantities was prepared:

$Y_2O_3$—0.917 mol, 10.35 g.
$Eu_2O_3$—0.05 mol, 0.88 g.
$V_2O_5$—0.45 mol, 4.09 g.
$(NH_4)_2HPO_4$—0.90 mol, 5.94 g.
$H_3BO_3$—0.20 mol, 0.62 g.
$ZnO$—0.10 mol, 0.41 g.

The mixture was heated for approximately 2 hours at temperature of approximately 900° C. After cooling, the product obtained was pulverized and seived and subsequently it was heated for approximately 2 hours at a temperature of approximately 1200° C. After cooling, pulverisation and sieving of the product thus obtained, a third heat treatment took place for approximately 3 hours at a temperature of approximately 900° C. After cooling, pulverisation and sieving the product was ready for use. All heat treatments took place in air. The luminescent material thus prepared is defined by the formula $$Y_{0.917}Eu_{0.05}Zn_{0.05}V_{0.45}P_{0.45}B_{0.1}O_{3.9}$$

Other luminescent materials according to the invention may be prepared in an analogous manner. If, for example, the zinc oxide in the above given mixture is replaced by 0.10 mol (0.88 g.) of cadmium carbonate, a luminescent material is obtained which is defined by the formula $$Y_{0.917}Eu_{0.05}Cd_{0.05}V_{0.45}P_{0.45}P_{0.45}B_{0.1}O_{3.9}$$

MEASUREMENTS

To find out the influence of the magnitude of the zinc content and the cadmium content on the properties of the luminescent materials according to the invention a number of model tests were performed. Borate phosphate vandates defined by the formulas $$Y_{0.95-2/3q}Eu_{0.05}Me_q^{2+}(VO_4)_{0.45}(PO_4)_{0.45}(BO_3)_{0.1}$$

were prepared at different values for $q$. The light outputs of these powders were determined upon excitation by ultraviolet radiation having a wavelength of 254 nm. Subsequently the powders were subjected to a combined vacuum-temperature treatment. To this end the powders were heated for 1 hour in vacuo at a temperature of 600° C. After this treatment the light outputs of the powders were measured again. The results of these measurements are shown in Table I. The first column of this table indicates the value of $q$ for the different materials and the second column states the light output of each material. The light output of the known borate phosphate vanadate, which does not contain zinc and cadmium ($q=0$) is fixed at 100. The third column of Table I states the values of the light outputs of the luminescent materials after the vacuum temperature treatment in percents as compared with the untreated luminescent materials. The table shows that already a small replacement of yttrium by zinc or cadmium has a favourable influence on the light output. It is also clear that values for $q$ of between 0.02 and 0.15 are preferred.

TABLE I

| | $q$ | Light output basic powder at 254 nm. exc. | Light output after treatment, in percent as compared with the basic powder |
|---|---|---|---|
| | 0 | 100 | 86 |
| $Me^{2+}=Zn^{2+}$ | 0.025 | 108 | 85 |
| | 0.050 | 107 | 87 |
| | 0.075 | 105 | 89 |
| | 0.100 | 105 | 90 |
| | 0.150 | 106 | 66 |
| | 0.250 | 81 | 56 |
| $ME^{2+}=Cd^{2+}$ | 0.025 | 109 | 86 |
| | 0.050 | 108 | 89 |
| | 0.100 | 109 | 92 |
| | 0.150 | 109 | 89 |
| | 0.200 | 105 | 73 |
| | 0.250 | 94 | 67 |

To check the occurrence of stains and discoloration in the screens of high-pressure mercury vapour discharge lamps accelerated life tests were performed. The discharge vessel of a high-pressure mercury vapour discharge lamp of 400 w. was placed in an outer envelope which for normal use is intended for a 250 watt lamp and whose inner side is provided with the luminescent material to be examined. The lamps thus mounted were operated during which it was checked at certain points of time during their lives how many lamps showed stain formation and discoloration. During this experiment luminescent materials were used which are defined by the formula

namely a material A for which $q=0$ (not according to the invention), a material B for which $Me^{2+}=Zn^{2+}$ and $q=0.05$ and a material C for which $Me^{2+}=Cd^{2+}$ and $q=0.05$. The materials B and C are materials according to the invention. Table II gives the number of trial lamps for the materials A, B and C, the mean light output of these lamps at 0 hours in l./w. and the number of lamps without stains at different points of time during their lives.

TABLE II

| Luminescent material | Number of lamps | Light output at 0 hours in L/W | Number of stainless lamps after— | | | | |
|---|---|---|---|---|---|---|---|
| | | | 100 hours | 250 hours | 430 hours | 650 hours | 1,000 hours |
| A. $q=0$ | 4 | 60.1 | 0 | | | | |
| B. $Me^{2+}=Zn^{2+}$ $q=0.05$ | 5 | 61.1 | 5 | 4 | 3 | 1 | 0 |
| C. $Me^{2+}=Cd^{2+}$ $q=0.05$ | 5 | 60.7 | 5 | 5 | 5 | 5 | 5 |

Table II shows that all lamps provided with the known borate phosphate vanadate already showed stains after 100 operating hours. For lamps of the zinc-containing luminescent material according to the invention this was the case only after 1000 operating hours, while all lamps of the cadmium-containing luminescent materials according to the invention still did not show stain formation after 1000 operating hours.

What is claimed is:

1. A luminescent material activated by trivalent europium defined by the formula

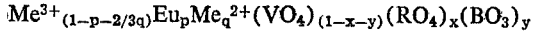

in which $Me^{3+}$ represents at least one of the elements from the group consisting of yttrium and gadolinium, $Me^{2+}$ represents at least one of the elements from the group consisting of zinc and cadmium and R represents at least one of the elements from the group consisting of phosphorus and arsenic, and in which $$0.01 \leq p \leq 0.18$$
$$0.01 \leq q \leq 0.25$$
$$0 \leq x \leq 0.80$$
$$0.02 \leq y \leq 0.60$$
$$x+y \leq 0.90$$

2. A luminescent material as claimed in claim 1 wherein $$0.02 \leq p \leq 0.10$$

and $$0.02 \leq q \leq 0.15$$

3. A luminescent material as claimed in claim 2 wherein $$0.30 \leq x \leq 0.60$$

and $$0.02 \leq y \leq 0.15$$

References Cited

UNITED STATES PATENTS 3,507,803   4/1970   Wanmaker et al. __ 252—301.4 R

ROBERT D. EDMONDS, Primary Examiner

U.S. Cl. X.R.

252—301.6 P